US012606296B2

(12) United States Patent
Strefling et al.

(10) Patent No.: US 12,606,296 B2
(45) Date of Patent: Apr. 21, 2026

(54) AIRCRAFT MODAL SUPPRESSION SYSTEM

(71) Applicant: The Boeing Company, Arlington, VA (US)

(72) Inventors: Paul C. Strefling, Seattle, WA (US); John M. Nappi, Jr., Seattle, WA (US); Jared D. Weaver, Seattle, WA (US); Sascha K. Ruegamer, Seattle, WA (US); William J. Wheeler, Redmond, WA (US); Tyler B. Wilhelm, Everett, WA (US); Thomas D. Potter, Seattle, WA (US); Abraham J. Pachikara, Seattle, WA (US); Michael A. Long, Snohomish, WA (US); Matthew E. Gajda, Snohomish, WA (US); Christopher A. Jensen, Bothell, WA (US); Brad E. Xanthopoulos, Seattle, WA (US); Bryan A. Lopez, Seattle, WA (US); Brian L. Beechinor, Seattle, WA (US); Kimberly A. Hinson, Seattle, WA (US); Alexander C. Ho, Seattle, WA (US)

(73) Assignee: The Boeing Company, Arlington, VA (US)

( * ) Notice: Subject to any disclaimer, the term of this patent is extended or adjusted under 35 U.S.C. 154(b) by 267 days.

(21) Appl. No.: 18/470,267

(22) Filed: Sep. 19, 2023

(65) Prior Publication Data

US 2025/0091711 A1      Mar. 20, 2025

(51) Int. Cl.
*B64C 13/16*          (2006.01)
*F16F 15/00*          (2006.01)

(52) U.S. Cl.
CPC ............ *B64C 13/16* (2013.01); *F16F 15/002* (2013.01)

(58) Field of Classification Search
CPC ....... B64C 13/16; F16F 15/002; G05D 1/496; G05D 1/606; G05D 2109/22; G05D 2111/52; B64D 45/00
See application file for complete search history.

(56) References Cited

U.S. PATENT DOCUMENTS 5,072,893 A      12/1991   Chakravarty et al.
7,191,985 B2     3/2007    Najmabadi et al.
(Continued)

FOREIGN PATENT DOCUMENTS

EP          1607326 A1    12/2005

OTHER PUBLICATIONS

European Patent Office, Extended European Search Report in related application EP24200100, issued Feb. 11, 2025.

*Primary Examiner* — Donald J Wallace
(74) *Attorney, Agent, or Firm* — Kolitch Romano Dascenzo Gates LLP

(57)          ABSTRACT

Systems and methods of aircraft modal suppression informed by an underlying non-uniform vertical turbulence model and uniform lateral turbulence model. The systems and methods include receiving a plurality of signals from on-board inertial sensors of an aircraft, utilizing the plurality of signals to generate a plurality of observers, utilizing the observers to determine a control law command for controlling one or more control surfaces of the aircraft, and moving the one or more control surfaces of the aircraft in accordance with the determined control law command such that lateral mode vibrations of the aircraft are diminished.

20 Claims, 7 Drawing Sheets

10

Uniform Lateral Gust
(defined as gust angle = 90 deg)

Gust angle
(in degrees)

Nonuniform Vertical Gust
(defined as gust angle = 0 deg)

(56)  References Cited

U.S. PATENT DOCUMENTS

| | | | |
|---|---|---|---|
| 10,793,260 | B1 | 10/2020 | Strefling et al. |
| 11,059,569 | B1 | 7/2021 | Nguyen et al. |
| 2006/0237594 | A1 | 10/2006 | Najmabadi et al. |
| 2008/0203232 | A9* | 8/2008 | Enzinger ................. B64C 13/16 |
| | | | 244/195 |
| 2016/0357191 | A1* | 12/2016 | Abdel-Motagaly .......................... |
| | | | G05D 1/0066 |

* cited by examiner

Traditional uniform vertical turbulence patch

10

Nonuniform vertical turbulence patch

10

10

Traditional uniform lateral turbulence patch

200

202
RECEIVING SIGNALS FROM
ON-BOARD INERTIAL SENSORS

204
UTILIZING SIGNALS TO
GENERATE OBSERVERS

206
UTILIZING OBSERVERS TO GENERATE
CONTROL LAW COMMANDS

208
MOVING CONTROL SURFACES IN ACCORDANCE
WITH CONTROL LAW COMMANDS

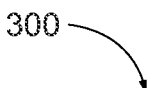

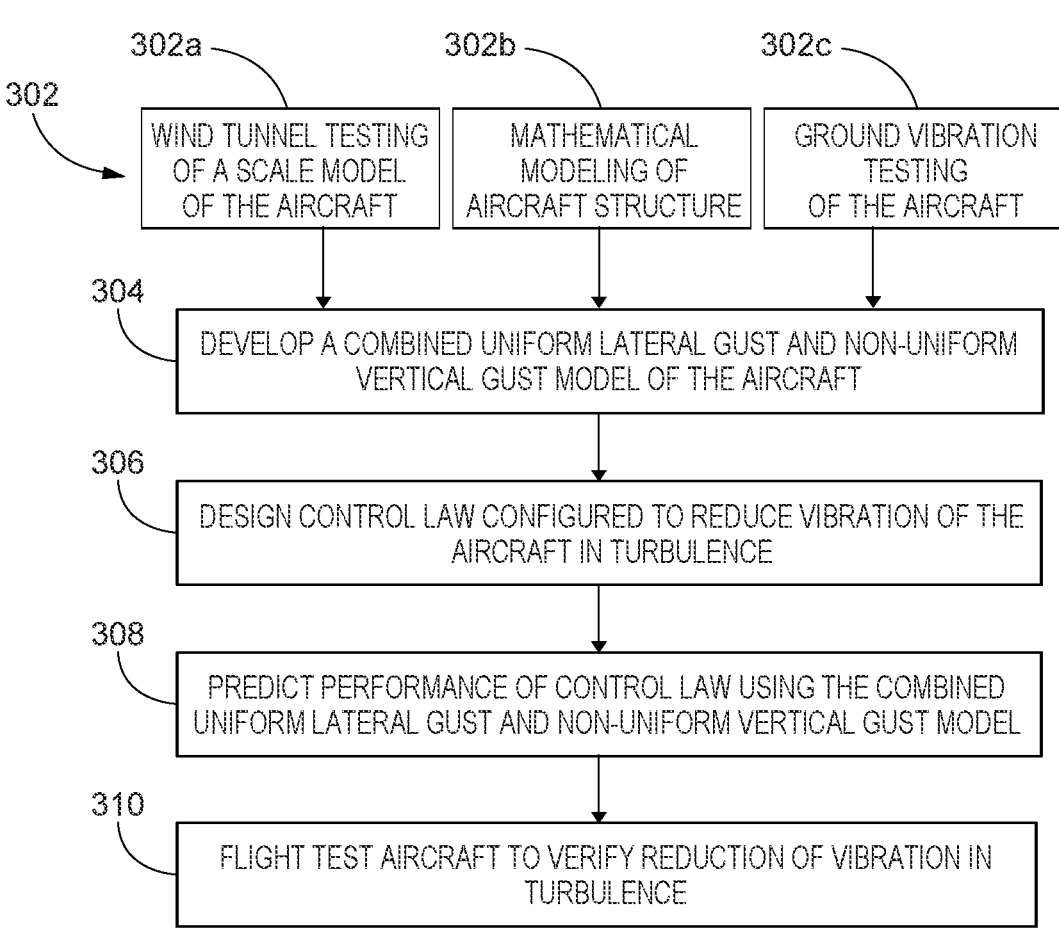

300

302

302a — WIND TUNNEL TESTING OF A SCALE MODEL OF THE AIRCRAFT

302b — MATHEMATICAL MODELING OF AIRCRAFT STRUCTURE

302c — GROUND VIBRATION TESTING OF THE AIRCRAFT

304 — DEVELOP A COMBINED UNIFORM LATERAL GUST AND NON-UNIFORM VERTICAL GUST MODEL OF THE AIRCRAFT

306 — DESIGN CONTROL LAW CONFIGURED TO REDUCE VIBRATION OF THE AIRCRAFT IN TURBULENCE

308 — PREDICT PERFORMANCE OF CONTROL LAW USING THE COMBINED UNIFORM LATERAL GUST AND NON-UNIFORM VERTICAL GUST MODEL

310 — FLIGHT TEST AIRCRAFT TO VERIFY REDUCTION OF VIBRATION IN TURBULENCE

FIG. 8

AIRCRAFT MODAL SUPPRESSION SYSTEM

FIELD

This disclosure relates to systems and methods for aircraft control. More specifically, the disclosed embodiments relate to aircraft modal suppression.

INTRODUCTION

Known solutions for designing modal suppression control laws are based on turbulence models which rely on uniform gusts and fail to capture the non-uniform contributions of gusts found in nature. This deficiency limits the performance of the previous modal suppression functions, and in some cases may limit its benefit completely. Without an accurate gust input model, the response of the airframe in turbulence remains a challenging problem in modal suppression. Only a model which accurately captures the effect of gust penetration can provide an appropriate foundation to design a feedback control system. Accordingly, improvements are required in the field of aircraft modal suppression.

SUMMARY

The present disclosure provides systems, apparatuses, and methods relating to aircraft modal suppression.

The presently disclosed methods include, for example, a method of aircraft modal suppression that includes receiving a plurality of signals from on-board inertial sensors of an aircraft, the plurality of signals corresponding to motions of one or more portions of the aircraft; utilizing the plurality of signals to generate a plurality of observers, each observer comprising one or more estimated states of the aircraft; utilizing the observers to determine control law commands for controlling one or more control surfaces of the aircraft, wherein the control law commands are configured to reduce vibration of the aircraft that is induced by a combination of lateral wind gusts (which may be uniform or non-uniform) and non-uniform vertical wind gusts; and moving the one or more control surfaces of the aircraft in accordance with the control law commands.

In some methods according to the present teachings, the plurality of sensor signals may include a first lateral acceleration at a forward portion of a fuselage of the aircraft; a second lateral acceleration at an aft portion of the fuselage of the aircraft; a third lateral acceleration at a midportion of the fuselage of the aircraft; a yaw rate at the midportion of the fuselage of the aircraft; and a roll rate at the midportion of the fuselage of the aircraft.

In some methods according to the present teachings, each observer may include one or more estimated states of a respective one of the control surfaces. In some cases, the control surfaces may include a rudder of the aircraft; ailerons of the aircraft; and/or flaperons of the aircraft.

In some methods according to the present teachings, the control law commands for the ailerons and/or flaperons of the aircraft may be antisymmetric.

In some methods according to the present teachings, the control law commands may be configured to dampen lateral mode excitations, and in some cases, elastic contributions to the lateral mode excitations contain frequency components below 10 Hertz.

In some methods according to the present teachings, generating the plurality of observers includes applying one or more operations to one or more of the plurality of signals, the operations including at least one of addition, subtraction, and filtering.

The present teachings further describe a data processing system for aircraft modal suppression, including one or more processors; a memory; and a plurality of instructions stored in the memory and executable by the one or more processors to receive a plurality of signals from on-board inertial sensors of an aircraft, the plurality of signals corresponding to motions of one or more portions of the aircraft; utilize the plurality of signals to generate a plurality of observers, each observer comprising one or more estimated states of the aircraft; utilize the observers to determine control law commands for one or more control surfaces of the aircraft, wherein the control law commands are configured to reduce vibration of the aircraft that is induced by a combination of uniform or non-uniform lateral wind gusts and non-uniform vertical wind gusts; and control the one or more control surfaces of the aircraft in accordance with the control law commands.

In some systems according to the present teachings, the plurality of signals received by the one or more processors includes a first lateral acceleration at a forward portion of a fuselage of the aircraft; a second lateral acceleration at an aft portion of the fuselage of the aircraft; a third lateral acceleration at a midportion of the fuselage of the aircraft; a yaw rate at the midportion of the fuselage of the aircraft; and a roll rate at the midportion of the fuselage of the aircraft.

In some systems according to the present teachings, each observer comprises one or more estimated states of a respective one of the control surfaces. In some systems, the control surfaces include a rudder of the aircraft; ailerons of the aircraft; and/or flaperons of the aircraft.

In some systems according to the present teachings, the control law commands for the ailerons and/or the flaperons of the aircraft are antisymmetric.

In some systems according to the present teachings, the control law commands are configured to dampen lateral mode excitations. In some systems, the lateral mode excitations have frequencies less than 10 Hertz.

In some systems according to the present teachings, generating the plurality of observers includes applying one or more operations to one or more of the plurality of signals, the operations including at least one of addition, subtraction, and filtering.

The present teachings also disclose methods of reducing aircraft vibrations induced by wind gusts, including measuring motions of the aircraft including at least one lateral acceleration, a roll rate, and a yaw rate; using the measured motions of the aircraft to estimate vibrations along the body of the aircraft induced by a combination of uniform or non-uniform lateral wind gusts and non-uniform vertical wind gusts; and compensating for the estimated vibrations by moving at least one of the aircraft ailerons and the aircraft flaperons.

In some methods according to the present teachings, measuring the motions of the aircraft includes measuring lateral accelerations of a nose portion, a tail portion and a center of gravity portion of the aircraft, and measuring a roll rate and a yaw rate of the center of gravity portion of the aircraft; and compensating for the estimated vibrations includes compensating for estimated lateral mode excitations having elastic mode frequencies less than 10 Hertz.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 8 is a flow chart depicting steps of an illustrative method of designing an aircraft modal suppression system in accordance with aspects of the present disclosure.

DETAILED DESCRIPTION

Figure 1:
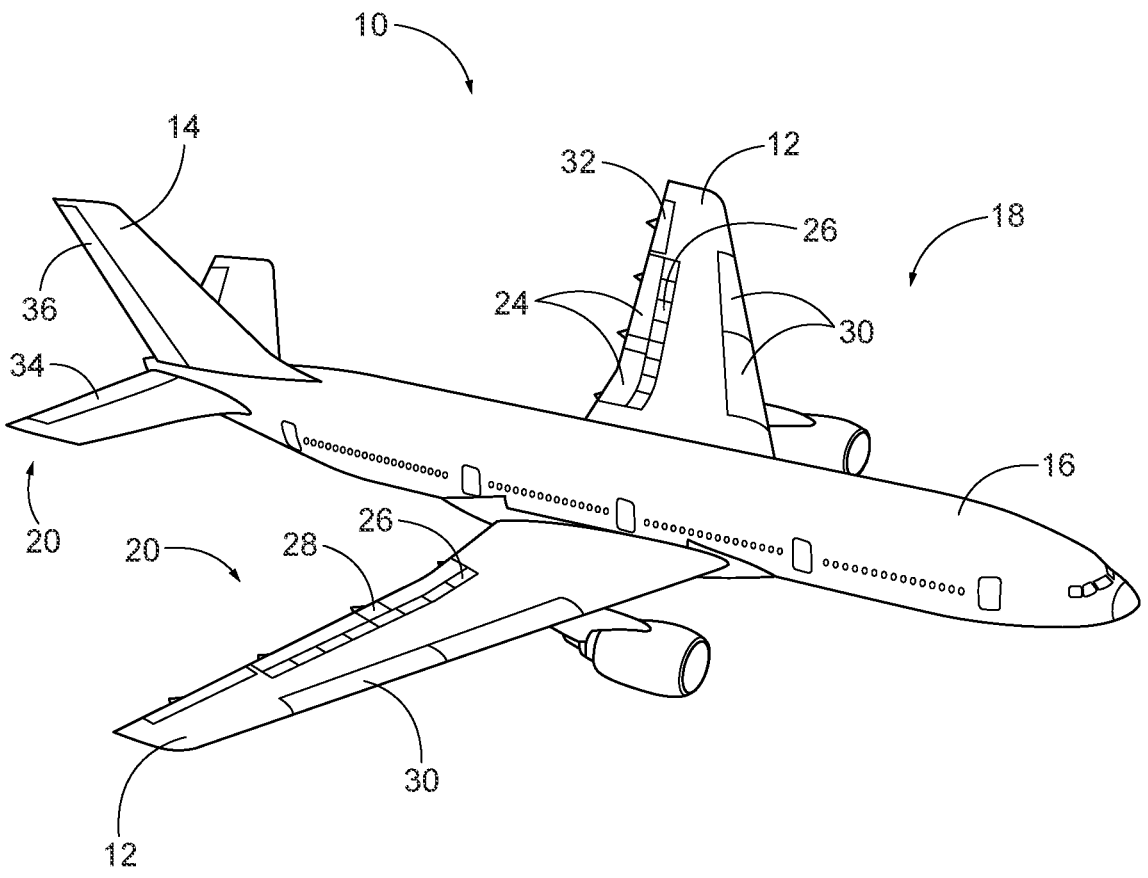
FIG. 1 is an isometric view of an illustrative aircraft in accordance with aspects of the present disclosure.

Various aspects and examples of an aircraft modal suppression system, as well as related methods, are described below and illustrated in the associated drawings. Unless otherwise specified, an aircraft modal suppression system in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first," "second," and "third" are used to distinguish or identify various members of a group, or the like, and are not intended to show serial or numerical limitation.

"AKA" means "also known as," and may be used to indicate an alternative or corresponding term for a given element or elements.

The terms "inboard," "outboard," "forward," "aft," and the like are intended to be understood in the context of a host vehicle on which systems described herein may be mounted or otherwise attached. For example, "outboard" may indicate a relative position that is laterally farther from the centerline of the vehicle, or a direction that is away from the vehicle centerline. Conversely, "inboard" may indicate a direction toward the centerline, or a relative position that is closer to the centerline. Similarly, "forward" means toward the front portion of the vehicle, and "aft" means toward the rear of the vehicle. In the absence of a host vehicle, the same directional terms may be used as if the vehicle were present. For example, even when viewed in isolation, a device may have a "forward" edge, based on the fact that the device would be installed with the edge in question facing in the direction of the front portion of the host vehicle.

"Processing logic" describes any suitable device(s) or hardware configured to process data by performing one or more logical and/or arithmetic operations (e.g., executing coded instructions). For example, processing logic may include one or more processors (e.g., central processing units (CPUs) and/or graphics processing units (GPUs)), microprocessors, clusters of processing cores, FPGAs (field-programmable gate arrays), artificial intelligence (AI) accelerators, digital signal processors (DSPs), and/or any other suitable combination of logic hardware.

A "controller" or "electronic controller" includes processing logic programmed with instructions to carry out a controlling function with respect to a control element. For example, an electronic controller may be configured to receive an input signal, compare the input signal to a selected control value or setpoint value, and determine an output signal to a control element (e.g., a motor or actuator) to provide corrective action based on the comparison. In another example, an electronic controller may be configured to interface between a host device (e.g., a desktop computer, a mainframe, etc.) and a peripheral device (e.g., a memory device, an input/output device, etc.) to control and/or monitor input and output signals to and from the peripheral device.

Directional terms such as "up," "down," "vertical," "horizontal," and the like should be understood in the context of the particular object in question. For example, an object may be oriented around defined X, Y, and Z axes. In those examples, the X-Y plane will define horizontal, with up being defined as the positive Z direction and down being defined as the negative Z direction.

"Providing," in the context of a method, may include receiving, obtaining, purchasing, manufacturing, generating, processing, preprocessing, and/or the like, such that the object or material provided is in a state and configuration for other steps to be carried out.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

In general, a method of aircraft modal suppression and a corresponding system is described. The method and system of aircraft modal suppression encompasses a model-based design of a modal suppression control law. The underlying model utilized in determining the control law utilizes non-uniform gusts to accurately model the gust penetration of the aircraft in order to model the dynamics of the airframe when subject to turbulence. While previously known modeling techniques assumed that vertical gusts affected both wings symmetrically (referred to as "uniform models"), this limitation fails to accurately represent what is observed in testing and in nature, namely, that vertical gusts excite lateral vibration modes.

To solve this deficiency, a novel approach incorporating a "non-uniform" model was developed. The non-uniform model is configured to model the effect of turbulence by segmenting the airframe into multiple span-wise gust segments in a finite element model. The multiple segments effectively divide up the finite element model, thereby analyzing respective gust penetrations of each of the different span-wise locations of the model. The segments can then be combined into an accurate gust response, for example by computing the Von Karman cross spectra between the segments. The non-uniform model provides insight into the vibration modes that are excited in turbulence and the relative contribution of each mode to the response at a point on the aircraft. Accordingly, this information may be used to the optimize the design of the modal suppression control law.

The design of a feedback control law for an aircraft modal suppression system necessitates a tradeoff between performance and stability. In this context, performance is measured by the reduction of the unwanted vibrational modes stirred up in turbulence, with more reduction being desirable. Stability determines the ability of the system to operate without producing unwanted oscillations arising from an interaction between the control system and the response that it produces in the aircraft. In practice, the requirement for stability places a bound on the attainable performance of the aircraft modal suppression system.

For an aircraft with the familiar tube-and-wing design, lateral vibration is usually dominated by a symmetric, elastic deformation of the fuselage about its center, known as the first body bending mode. Reduction of lateral vibration due to first body bending can be accomplished by moving a control surface, for example a rudder, in opposition to the measured vibration from a sensor. If the aircraft response to the control surface movement is out of phase with the unwanted vibration, the lateral vibration is reduced.

In theory, an aircraft modal suppression system is usually most effective when the sensor and control surface are placed at the same location in or on the aircraft. In control engineering, this concept is known as collocated control. However, in practice, collocated control is not always feasible or even desirable for reasons of weight, cost, complexity, and/or challenges of spatial integration. Furthermore, the placement of sensors and control surfaces on the aircraft are often determined by other considerations such as the stability and control of the aircraft and the control system used to augment those characteristics. For this reason, the sensors and control surfaces available for the implementation of an aircraft modal suppression system may be sub-optimal for that purpose. Not using collocated control introduces challenges of observability and controllability. In the context of aircraft modal suppression systems, observability refers to the ability of the sensors to measure the unwanted vibration that the system seeks to reduce, while controllability refers to the ability of the control surfaces to effect a reduction in the unwanted vibration.

The problem of observability can be mitigated through the intentional design of a state observer, referred to subsequently simply as an "observer." The purpose of the observer is to estimate one or more states of the aircraft by applying mathematical operations to data, e.g., from available sensor measurements. These estimated states may be physical in nature and represent quantities such as a position, velocity, or acceleration pertaining to a portion of the aircraft. One of ordinary skill in the art also recognizes the possibility that one or more of the estimated states may also be abstract in the sense that they correlate with a quantity of interest, such as the vibration of a specific portion of the aircraft, yet not represent it in a way that can be directly compared to the measurement of any hypothetical sensor located at that portion of the aircraft. Accordingly, the observer is useful to the design of an aircraft modal suppression system by estimating information that is otherwise unavailable by measurement. This information is consumed by the control law which will be described later.

For an aircraft with a single dominant elastic mode of vibration, the design of the aircraft modal suppression system is relatively simple, because the performance is summarized by the percentage reduction of the single dominant mode, leading to obvious design tradeoffs between performance and stability. However, as the design of airplane fuselages and wings become longer and more flexible due to competitive demands, additional modes of vibration may arise and complicate the aircraft modal suppression system design. Like the first body bending mode, the motion from these additional vibrational modes is unwanted and is detrimental to the aircraft's ride quality in turbulence. These additional vibrational modes also have different mode shapes, or a specific pattern of elastic deformation across the aircraft. To reduce the effects of the additional vibrational modes on the aircraft may necessitate the use of different control surfaces, such as ailerons and flaperons. When other modes are present there is also a risk of spillage, which is an undesirable amplification of modes that are adjacent in frequency to the modes that the aircraft modal suppression system is trying to reduce.

Furthermore, the performance of an aircraft modal suppression system becomes more difficult to evaluate when multiple significant vibrational modes exist. For example, suppose there are three modes and the control law designer has a choice between reducing only the first mode by 75% (with neutral impact to the other two modes), or equally reducing all three modes by 30% each. Without further information, it may not be readily apparent which of these two control law designs would result in a better ride quality.

The presently disclosed methods of aircraft modal suppression resolve this conundrum through an innovative use of the non-uniform model. Using the accurate gust response from this model, the control law designer determines the relative contribution of each vibrational mode to the aircraft response in turbulence. With this information the optimum control law can be identified and selected. Continuing the previous example, if the non-uniform model predicts that all modes contribute equally to the airplane motion in turbulence, then the second control law reducing each mode by 30% each is superior as it would result in a lower overall response of 2.1 (i.e., 0.7+0.7+0.7) compared to the first control law's response of 2.25 (i.e., 0.25+1+1). However, if the non-uniform model shows that the response is dominated by the first mode, then the other control law may be preferred.

Accordingly, in general, the disclosed methods of aircraft modal suppression include receiving a plurality of signals from on-board inertial sensors of an aircraft corresponding to motions of one or more portions of the aircraft. The on-board inertial sensors of the aircraft include sensors configured to measure accelerations, for example, at a forward portion, a midportion, and an aft portion of the fuselage of the aircraft. In some examples, the on-board inertial sensors are configured to measure lateral accelerations at the forward portion, midportion, and aft portion of the fuselage, as well as a yaw rate and a roll rate at the midportion of the fuselage. More generally, methods according to the present teachings may use inertial sensors at various locations on an aircraft.

The methods further include utilizing the plurality of signals to generate a plurality of observers. In some examples, generating the plurality of observers includes applying one or more operations such as addition, subtraction, and/or filtering to one or more signals of the plurality of signals. Each resulting observer comprises one or more estimated states of the aircraft, such as (for example) an estimated motion and/or acceleration of a portion of the aircraft, or an abstract state of the aircraft that is correlated to a quantity of interest, such as a degree of vibration of a portion of the aircraft. In some examples, each observer comprises one or more estimated states of a respective control surface of the aircraft, such as an estimated motion and/or acceleration of the control surface. For example, the plurality of observers may comprise estimated motions and/or accelerations at a rudder of the aircraft, at one or more ailerons of the aircraft, and/or at one or more flaperons of the aircraft. In other words, the measured signals of the on-board inertial sensors located at the forward portion, midportion, and aft portion of the fuselage may be utilized to generate observer estimations of motion/acceleration at control surfaces of the aircraft.

The estimated states (i.e., the observers) may then be utilized to determine control law commands for one or more control surfaces of the aircraft, such that vibrations of the aircraft are reduced. In particular, the control law commands are configured to reduce vibrations of the aircraft that are induced by a combination of uniform lateral wind gusts and non-uniform vertical wind gusts, although in some cases the lateral wind gusts might also be non-uniform. In some examples, the control law commands are configured to dampen lateral mode excitations of the aircraft. In some examples, the control law commands are configured to dampen lateral mode excitations having elastic contributions comprising frequency components below 10 Hertz. In some examples, the control law commands include antisymmetric commands for the ailerons and/or the flaperons of the aircraft.

As described herein, the modal suppression methods and systems utilize a Multi Input Multi Output (MIMO) feedback control law. This type of control strategy uses multiple sensors (inputs) and multiple control surfaces (outputs). In general, the methods utilize a plurality of on-board inertial measurement signals to construct a plurality of estimated observations of how a gust has excited an aircraft. The observations or estimates are referred to as one or more observers. The output of the observer(s) is used, e.g., as the input to high order shaping filters, to construct control law commands for one or more control surfaces of the aircraft.

Accordingly, the modal suppression methods and systems described herein are MIMO observer-based feedback controls configured to reduce the lateral vibration of the airplane based on a dynamic flight model that captures the effects of non-uniform gusts on the airframe. One of ordinary skill in the art will also recognize the possibility of using a feedback control law that is Single Input Single Output (SISO), Single Input Multiple Output (SIMO), or Multiple Input Single Output (MISO). Depending on the particular aircraft and the design constraints, one of these other feedback approaches may be selected instead.

The presently disclosed methods further include controlling (e.g., moving) the control surfaces in accordance with the control law commands. For example, the methods may include controlling the rudder, flaperons, and/or ailerons in accordance with the control law commands to reduce vibrations of the aircraft.

In actual implementation, there may not be a distinct separation between the part of the system creating the observations and the part of the system implementing the modal suppression control law. In some embodiments of the disclosed invention, some or all of the calculations needed to produce the estimated observations may be subsumed into the high order shaping filters also containing the control law. Aspects of the modal suppression systems and methods may be embodied as a computer method, computer system, or computer program product. Accordingly, aspects of the modal suppression systems and methods may take the form of an entirely hardware embodiment, an entirely software embodiment (including firmware, resident software, microcode, and the like), or an embodiment combining software and hardware aspects, all of which may generally be referred to herein as a "circuit," "module," or "system." Furthermore, aspects of the modal suppression systems and methods may take the form of a computer program product embodied in a computer-readable medium (or media) having computer-readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable non-transitory, tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of modal suppression may be written in one or any combination of programming languages, including an object-oriented programming language (such as Java, C++), conventional procedural programming languages (such as C), and functional programming languages (such as Haskell). Mobile apps may be developed using any suitable language, including those previously mentioned, as well as Objective-C, Swift, C#, HTML5, and the like. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Aspects of the modal suppression systems and methods may be described below with reference to flowchart illustrations and/or block diagrams of methods, apparatuses, systems, and/or computer program products. Each block and/or combination of blocks in a flowchart and/or block diagram may be implemented by computer program instructions. The computer program instructions may be programmed into or otherwise provided to processing logic (e.g., a processor of a general purpose computer, special purpose computer, field programmable gate array (FPGA), or other programmable data processing apparatus) to produce a machine, such that the (e.g., machine-readable) instructions, which execute via the processing logic, create means for implementing the functions/acts specified in the flowchart and/or block diagram block(s).

Additionally or alternatively, these computer program instructions may be stored in a computer-readable medium that can direct processing logic and/or any other suitable device to function in a particular manner, such that the instructions stored in the computer-readable medium produce an article of manufacture including instructions which implement the function/act specified in the flowchart and/or block diagram block(s).

The computer program instructions can also be loaded onto processing logic and/or any other suitable device to cause a series of operational steps to be performed on the device to produce a computer-implemented process such that the executed instructions provide processes for implementing the functions/acts specified in the flowchart and/or block diagram block(s).

Any flowchart and/or block diagram in the drawings is intended to illustrate the architecture, functionality, and/or operation of possible implementations of systems, methods, and computer program products according to aspects of the modal suppression systems and methods. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

EXAMPLES, COMPONENTS, AND ALTERNATIVES

The following sections describe selected aspects of illustrative systems and methods of aircraft modal suppression as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Aircraft Modal Suppression System

This section describes an illustrative modal suppression system 100. System 100 is an example of the modal suppression system, described above.

FIG. 1 depicts an aircraft 10 comprising one or more flight control systems in accordance with the present disclosure. While aircraft 10 is depicted in FIG. 1 as a fixed-wing airliner, aircraft 10 and corresponding flight control systems are not limited to such examples, and aircraft 10 may be any fixed wing aircraft, commercial aircraft, military aircraft, passenger aircraft, autonomous aircraft, rotorcraft, etc. Aircraft 10 typically includes wings 12 and a tail 14 that are supported by a fuselage 16 to form and/or define an airframe 18. The wings 12 and the tail 14 include a plurality of flight control surfaces 20 that are configured to be selectively moved relative to support structures of the wings 12 or the tail 14. Examples of flight control surfaces 20 of wings 12 include flaps 24, spoilers 26, flaperons 28, slats 30, and ailerons 32. Examples of flight control surfaces 20 of tail 14 include elevators 34 and rudder 36. Examples of support structures include spars, ribs, or other underlying framework of a wing 12 or a tail 14.

The flight control surfaces 20 are configured to be selectively controlled, for example, moved between a stowed position and deployed position(s). The stowed position also may be described as a retracted configuration, and the deployed position also may be described as an extended configuration. Additionally, the flight control surfaces 20 may be rotated about a supporting hinge to adjust the angular deflection. Actuation of the flight control surfaces 20 changes one or more aerodynamic characteristics of the aircraft 10 in a desired manner. Actuation of the flight control surfaces 20 may be facilitated, controlled, and/or regulated by one or more actuators that are supported by, or otherwise coupled to, the support structures of the airframe.

Figure 2:
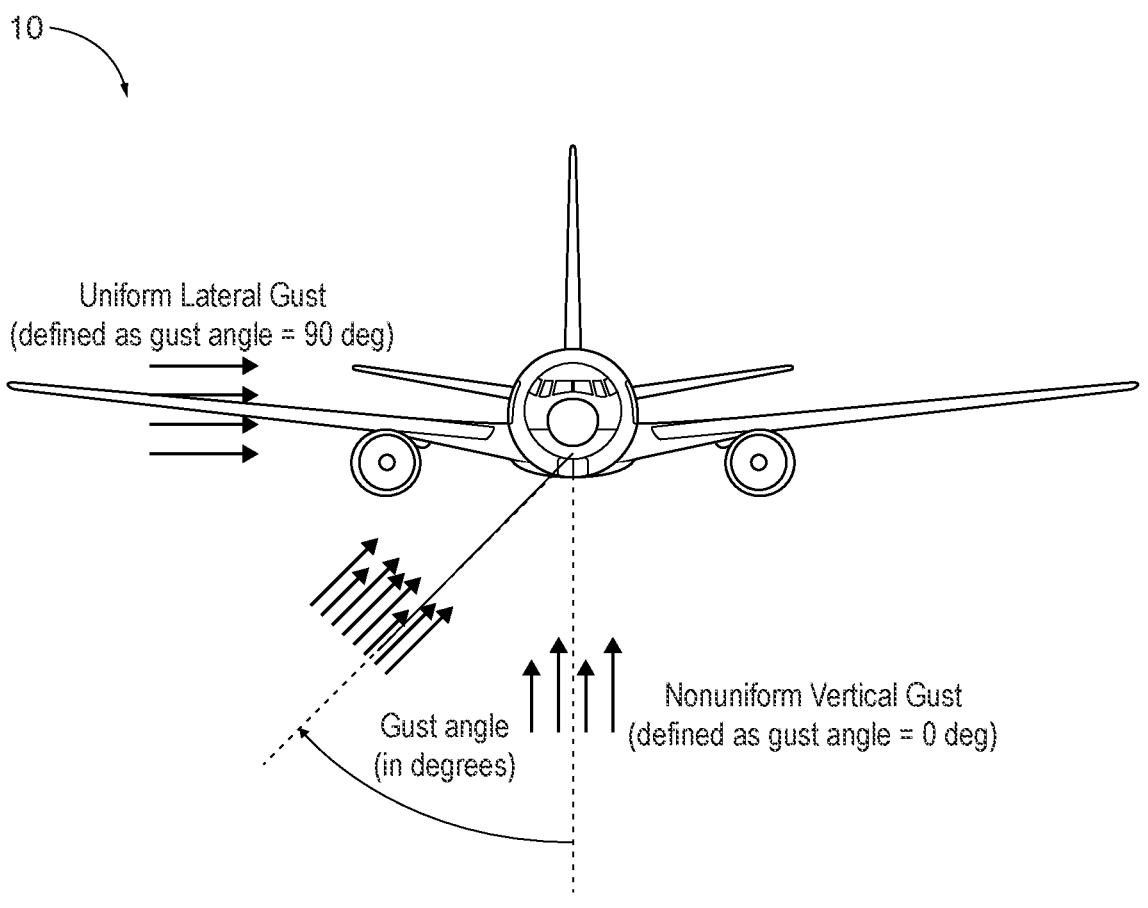
FIG. 2 is a front elevation view of the aircraft of FIG. 1 depicting turbulent wind gusts acting upon the aircraft.

With respect to FIGS. 2-5, aircraft 10 is subjected to turbulent gusts comprising regular and/or irregular flow of air, e.g., due to variations in atmospheric conditions. In general, turbulence occurs at different scales, such as from small, localized eddies to large weather systems. As shown in FIG. 2, turbulence can result in gusts ranging from vertical gusts, i.e., gusts having a zero-degree gust angle, to lateral gusts, i.e., gusts having a ninety-degree gust angle.

Figure 3:
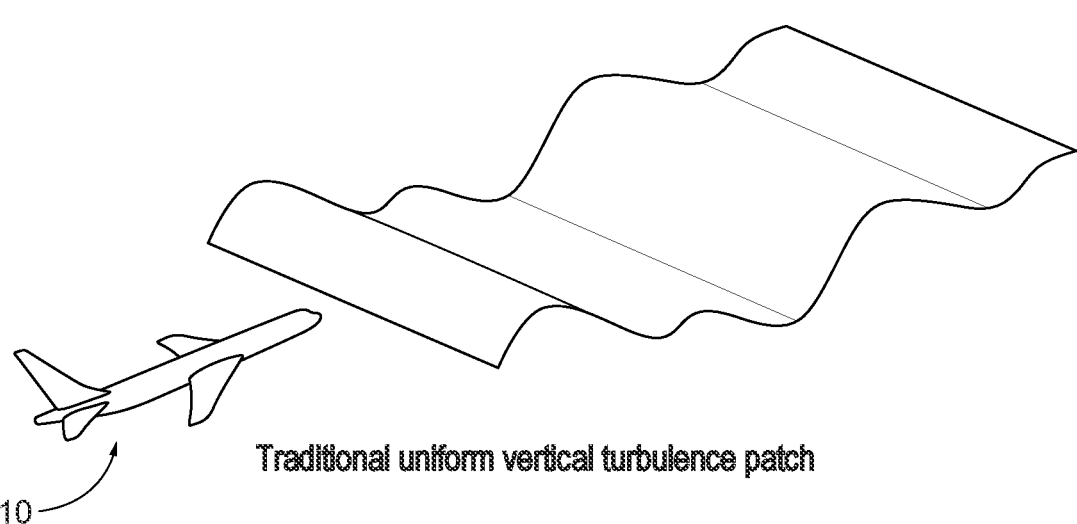
FIG. 3 is an isometric depiction of an aircraft flying into a region of uniform vertical wind gusts.

Known techniques for countering turbulence assumed that vertical gusts affected both wings symmetrically (referred to as "uniform models"), such as shown in FIG. 3. However, this limitation inhibits the model from accurately capturing, and therefore countering, the lateral modes on the airframe which are excited by non-uniform vertical gusts.

Figure 4:
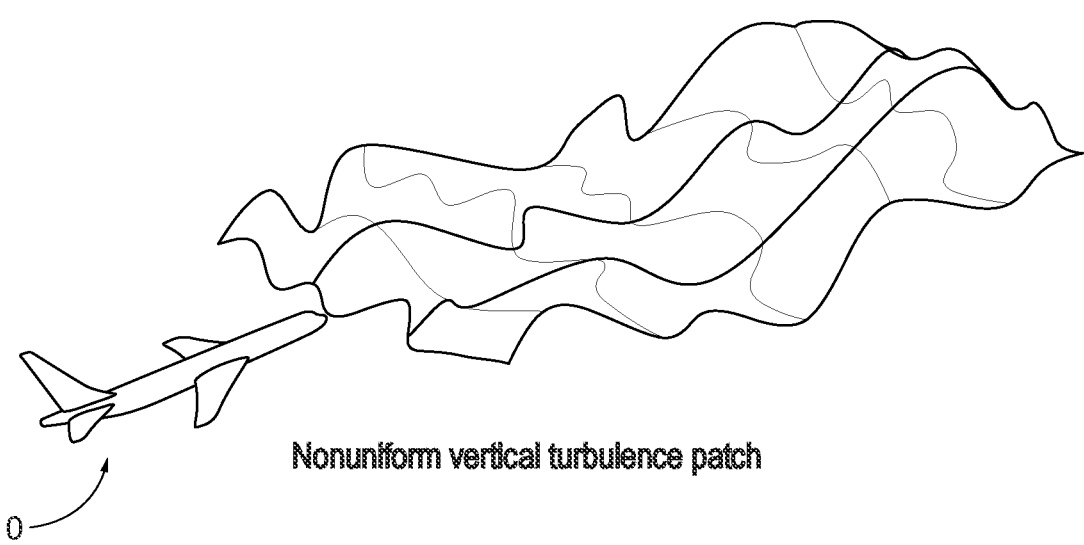
FIG. 4 is an isometric depiction of an aircraft flying into a region of non-uniform vertical wind gusts.
Figure 5:
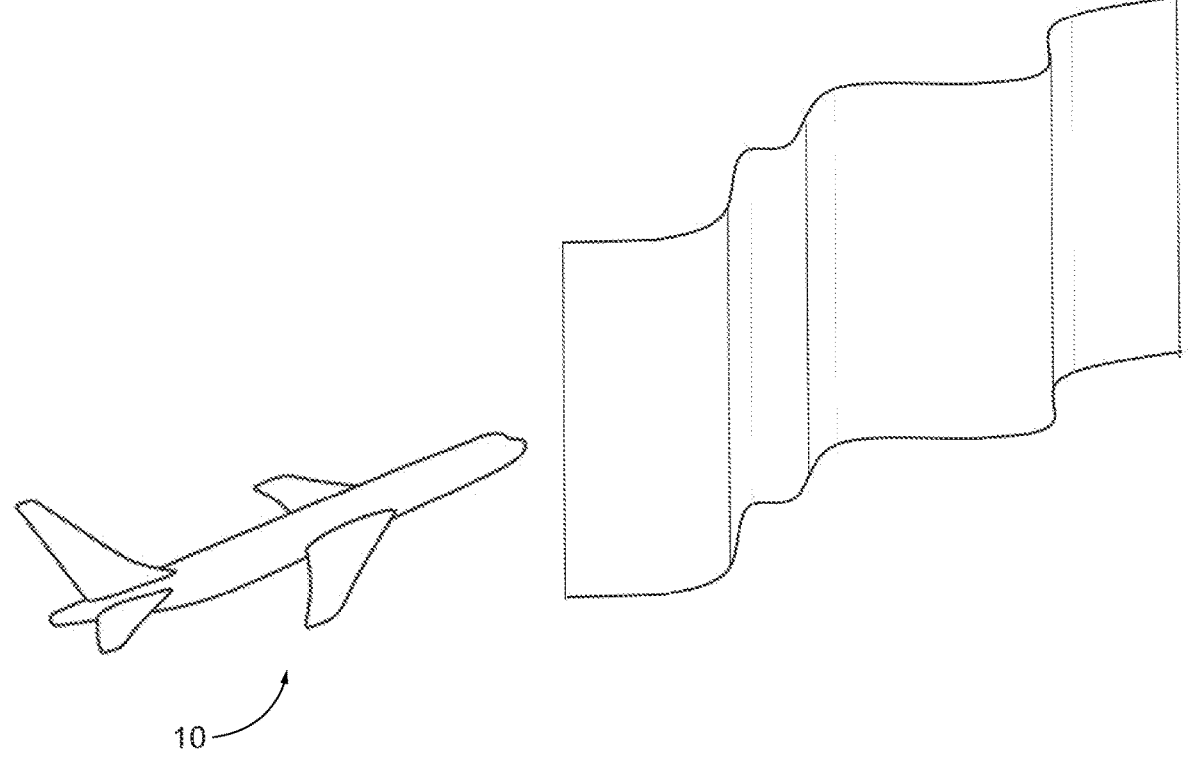
FIG. 5 is an isometric depiction of an aircraft flying into a region of uniform lateral wind gusts.

Turning to FIG. 4, the underlying turbulence model of the presently disclosed system utilizes non-uniform vertical gusts to represent the dynamics of the airframe when subject to turbulence. As described above, the non-uniform turbulence model is configured to model the effect of turbulence by segmenting the airframe into multiple span-wise gust segments in order to analyze respective gust penetrations of each of the different span-wise segments of the airframe. In addition to non-uniform vertical gusts, the underlying turbulence model may also utilize uniform lateral gusts to further analyze the effect of turbulent conditions on the airframe.

The underlying turbulence model is used to model and analyze the effects of turbulence on the airframe under a large variety of possible flight conditions, such as differing flight altitudes, aircraft loads, airspeeds, weather patterns, and turbulent conditions. Accordingly, for each combination of flight conditions the model is used to identify the lateral modes excited on the airframe and to determine an appropriate control surface adjustment to counter the lateral mode excitations under the varying conditions. In other words, the non-uniform turbulence model informs the design of high order shaping filters to determine control law commands for counteracting turbulent motion under various flight conditions.

Figure 6:
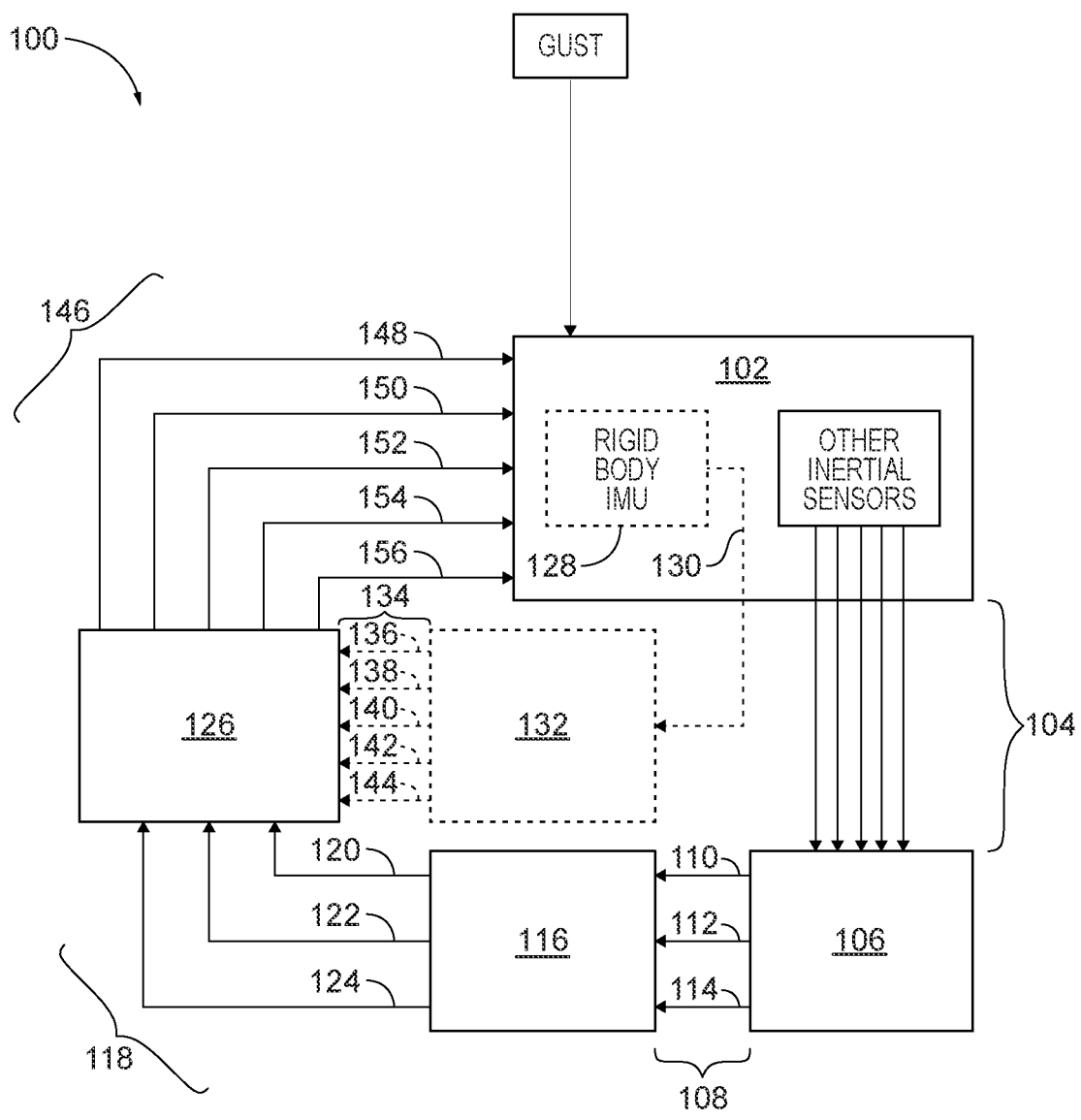
FIG. 6 is a schematic view of a modal suppression system in accordance with aspects of the present disclosure.

Turning to FIG. 6, a schematic view of modal suppression system 100 is shown. As shown in FIG. 6, a plurality of on-board inertial sensors 102 are disposed on portions of airframe 18 and are configured to measure motions of one or more portions of the airframe. In particular, in this embodiment on-board inertial sensors 102 are located at a forward portion, a midportion, and an aft portion of the airframe and are configured to measure lateral accelerations at the forward portion, midportion, and aft portion of the fuselage, as well as a yaw rate and a roll rate at the midportion of the fuselage. Other embodiments according to the present teachings may use inertial sensors at different locations and/or measuring different parameters of motion.

On-board inertial sensors 102 may comprise accelerometers, such as microelectromechanical systems (MEMS) accelerometers, piezoelectric accelerometers, capacitive accelerometers, etc., gyroscopes, such as MEMS gyroscopes, fiber optic gyroscopes (FOGs), ring laser gyroscopes (RLGs), etc., magnetometers, such as Hall effect magnetometers, magnetoresistive sensors, etc., and/or other suitable sensors capable of measuring changes in acceleration, orientation, and/or angular velocity. In some examples, one or more of the on-board inertial sensors comprise inertial measurement units (IMUs) configured to measure both linear and rotational accelerations.

The resulting signals 104 from the sensors 102 are provided to an observer module 106 configured to utilize signals 104 to generate a plurality of observers 108. For example, as described previously, signals 104 may include lateral accelerations at the forward portion, midportion, and aft portion of the fuselage, as well as a yaw rate and a roll rate at the midportion of the fuselage.

In some examples, generating the plurality of observers includes applying one or more operations such as addition, subtraction, and/or filtering to one or more signals of the plurality of signals. Each resulting observer 108 comprises one or more estimated states of the aircraft, such as an estimated motion and/or acceleration at a respective flight control surface 20. As shown in FIG. 6, in this example observers 108 comprise three estimated states of the aircraft, namely, a rudder observer 110 comprising estimated motion and/or acceleration at rudder 36, an aileron observer 112 comprising estimated motion and/or acceleration at aileron(s) 32, and a flaperon observer 114 comprising estimated motion and/or acceleration at flaperon(s) 28.

Rudder observer 110, aileron observer 112, and flaperon observer 114 are provided to a modal suppression control module 116. Modal suppression control module 116 utilizes the provided observer signals in conjunction with a control law developed using the above-described non-uniform turbulence model to determine control law commands (AKA control surface commands) for one or more control surfaces of the aircraft, such as control law commands 118. In particular, the modal suppression control module applies high order shaping filters to the rudder observer 110, aileron observer 112, and flaperon observer 114 signals to determine an appropriate set of control law commands for the flight control surfaces for dampening vibrations of the airframe. The optimal design of the high order shaping filters is determined through evaluation with the non-uniform turbulence model for one or more flight conditions. This configures the control law commands to reduce lateral mode excitations of the aircraft that are induced by a combination of uniform lateral wind gusts and non-uniform vertical wind gusts. In some examples, the control law commands are configured to dampen lateral mode excitations having elastic contributions comprising frequency components below 10 Hertz.

Control law commands 118 produced by modal suppression control module 116 comprise rudder command 120, aileron command(s) 122, and flaperon command(s) 124. In some examples, aileron commands 122 and/or flaperon commands 124 comprise antisymmetric commands. Control law commands 118 are then provided to a mixer module 126, described in more detail below.

Modal suppression system 100 optionally includes a rigid body IMU 128 used to measure low frequency (e.g., below 1.5 Hz) motion of the aircraft. Rigid body IMU 128 is configured to send a low frequency motion signal 130 to an optional rigid body control 132. Rigid body control 132 is configured to determine rigid body control law commands 134 for countering/damping the low frequency motion.

In general, rigid body control law commands 134 include a rigid body rudder command 136, a rigid body aileron command 138, a rigid body flaperon command 140, a rigid body spoiler command 142, and a rigid body elevator command 144. Rigid body control law commands 134 are then provided to mixer module 126.

Mixer module 126 is configured to receive control law commands 118 and optional rigid body control law commands 134 to produce command signals 146. Command signals 146 comprise the actionable commands to be sent to the actuators of the control surfaces. In some examples, mixer module 126 produces command signals 146 by combining control law commands 118 and rigid body control law commands 134 via one or more arithmetic, algebraic, and/or Boolean functions. In some examples, mixer module 126 produces command signals 146 by adding together the respective control law commands of control law commands 118 and rigid body control law commands 134. For example, mixer module 126 may produce a command signal for rudder 36 by adding together rudder command 120 and rigid body rudder command 136. In some examples, mixer module 126 produces command signals 146 by blending the respective control law commands of control law commands 118 and rigid body control law commands 134, such as with weighted summation (i.e., a weighted linear combination).

Command signals 146 can then be utilized for controlling (e.g., actuating) the control surfaces to change the aerodynamic properties of the aircraft such that lateral mode excitations are diminished, for example by reducing vibration of the aircraft that is induced by a combination of uniform lateral wind gusts and non-uniform vertical wind gusts. Command signals 146 may include, for example, an elevator command signal 148, a spoiler command signal 150, a flaperon command signal 152, an aileron command signal 154, and/or a rudder command signal 156.

B. Illustrative Aircraft Modal Suppression Method

Figure 7:
FIG. 7 is a flow chart depicting steps of an illustrative method for aircraft modal suppression in accordance with aspects of the present disclosure.
Figure 7:
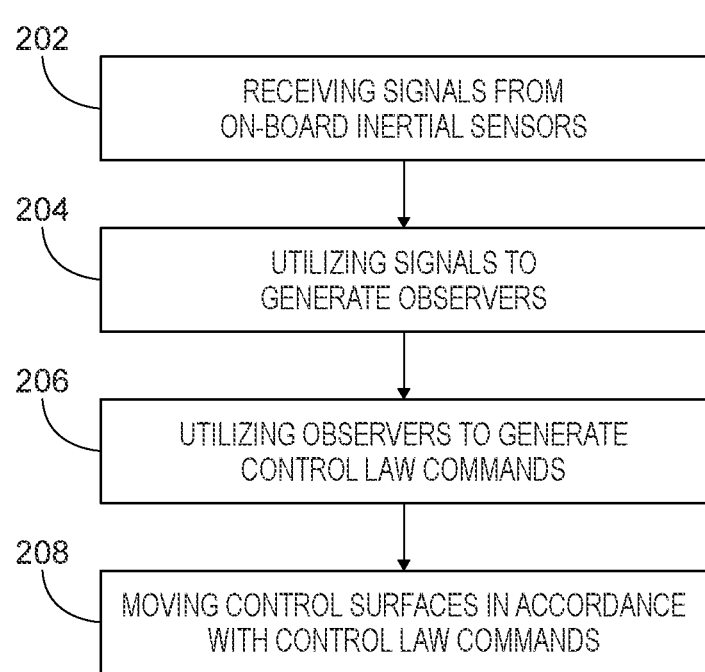

This section describes steps of an illustrative method 200 for aircraft modal suppression; see FIG. 7. Aspects of the aircraft modal suppression system may be utilized in the method steps described below. Where appropriate, reference may be made to components and systems that may be used in carrying out each step. These references are for illustration, and are not intended to limit the possible ways of carrying out any particular step of the method.

FIG. 7 is a flowchart illustrating steps performed in an illustrative method, and may not recite the complete process or all steps of the method. Although various steps of method 200 are described below and depicted in FIG. 7, the steps need not necessarily all be performed, and in some cases may be performed simultaneously or in a different order than the order shown.

Step 202 of method 200 includes receiving a plurality of signals from on-board inertial sensors of an aircraft corresponding to motions of one or more portions of the aircraft. The on-board inertial sensors of the aircraft include sensors configured to measure accelerations at any suitable portion(s) of the aircraft, such as a forward portion, a midportion, and an aft portion of the fuselage of the aircraft. In some examples, the on-board inertial sensors are configured to measure lateral accelerations at the forward portion, midportion, and aft portion of the fuselage, as well as a yaw rate and a roll rate at the midportion of the fuselage.

Step 204 of method 200 includes utilizing the plurality of signals received at step 204 to generate a plurality of observers. In some examples, step 204 includes applying one or more operations such as addition, subtraction, and/or filtering to one or more signals of the plurality of signals. Each resulting observer comprises one or more estimated states of the aircraft, such as an estimated motion and/or acceleration of a respective portion of the aircraft.

In some examples, each observer comprises one or more estimated states, such as an estimated motion and/or acceleration, of a respective control surface of the aircraft. For example, the plurality of observers may comprise estimated motions and/or accelerations of a rudder of the aircraft, one or more ailerons of the aircraft, and/or one or more flaperons of the aircraft. In other words, the measured signals of the on-board inertial sensors located at the forward portion, midportion, and aft portion of the fuselage are utilized to generate observer estimations of motion/acceleration of control surfaces of the aircraft. Yet another description of step 204 is that signals received in step 202 are used in one or more observers to compute estimated states of the aircraft.

Step 206 of method 200 includes utilizing the plurality of observers to determine control law commands for one or more control surfaces of the aircraft such that vibrations of the aircraft are reduced. In particular, step 206 includes determining control law commands which are configured to reduce vibration of the aircraft that is induced by a combination of uniform lateral wind gusts and non-uniform vertical wind gusts. In some examples, the lateral wind gusts also may be non-uniform. In some examples, the control law commands are configured to dampen lateral mode excitations of the aircraft. In some examples, the control law commands are configured to dampen lateral mode excitations having elastic contributions comprising frequency components below 10 Hertz. In some examples, the control law commands include antisymmetric commands for the ailerons and/or the flaperons of the aircraft.

Step 206 also may be described as utilizing estimated states of the aircraft (as determined by the observer(s)) in a control law to determine control law commands, where the control law is configured to reduce vibration of the aircraft resulting from a combination of uniform lateral gusts and non-uniform vertical gusts.

Step 208 of method 200 includes moving (e.g., actuating) the control surfaces of the aircraft in accordance with the control law commands. In some examples, step 208 includes moving control surfaces such as the rudder, flaperons, and/or ailerons of the aircraft in accordance with the determined control law commands, to reduce vibrations of the aircraft.

C. Illustrative Modal Suppression System Design Process

This section describes an exemplary method, generally indicated at 300, of using a non-uniform gust model to design an aircraft modal suppression system, such as system 100, which is capable of performing the methods discussed above, such as method 200; see FIG. 8.

At step 302, testing and modeling of the effects of non-uniform gusts on a particular aircraft is performed. This may include, for example, wind tunnel testing of a scale model of the aircraft as indicated at 302a, finite-element mathematical modeling of the aircraft structure as indicated at 302b, and/or ground vibration testing of the aircraft as indicated at 302c.

At step 304, the results of the testing and modeling of step 302 are used to develop a non-uniform gust model of the aircraft, i.e., a model of vibrational modes induced on the aircraft by non-uniform gusts.

At step 306, a control law is designed that is configured to reduce vibration of the aircraft in turbulence.

At step 308, predicted performance of the control law is determined using the non-uniform gust model.

At step 310, the aircraft is flight tested to verify that the control law reduces aircraft vibration in turbulence as predicted.

In some cases, steps 306, 308, and 310 may be repeated iteratively until a desired degree of vibration reduction is achieved.

D. Illustrative Combinations and Additional Examples

This section describes additional aspects and features of aircraft modal suppression methods and systems, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A method of aircraft modal suppression, the method comprising:

receiving a plurality of signals from on-board inertial sensors of an aircraft, the plurality of signals corresponding to motions of one or more portions of the aircraft;

utilizing the plurality of signals to generate a plurality of observers, each observer comprising one or more estimated states of the aircraft;

utilizing the plurality of observers to determine control law commands for one or more control surfaces of the aircraft, wherein the control law commands are configured to reduce vibration of the aircraft that is induced by a combination of uniform or non-uniform lateral wind gusts and non-uniform vertical wind gusts; and moving the one or more control surfaces of the aircraft in accordance with the control law commands.

A1. The method of paragraph A0, wherein the plurality of signals includes:

a first lateral acceleration at a forward portion of a fuselage of the aircraft;

a second lateral acceleration at an aft portion of the fuselage of the aircraft;

a third lateral acceleration at a midportion of the fuselage of the aircraft;

a yaw rate at the midportion of the fuselage of the aircraft; and a roll rate at the midportion of the fuselage of the aircraft.

A2. The method of A0 or A1, wherein each observer comprises one or more estimated states of a respective one of the control surfaces.

A3. The method of paragraph A2, wherein the control surfaces include:

a rudder of the aircraft;

ailerons of the aircraft; and flaperons of the aircraft.

A4. The method of paragraph A3, wherein the control law commands for the ailerons of the aircraft are antisymmetric.

A5. The method of paragraph A3, wherein the control law commands for the flaperons of the aircraft are antisymmetric.

A6. The method of any one of paragraphs A0 through A5, wherein the control law commands are configured to dampen lateral mode excitations.

A7. The method of paragraph A6, wherein elastic contributions to the lateral mode excitations contain frequency components below 10 Hertz.

A8. The method of any one of paragraphs A0 through A7, wherein generating the plurality of observers includes applying one or more operations to one or more of the plurality of signals, the operations including at least one of addition, subtraction, and filtering.

B0. A data processing system for aircraft modal suppression, the system comprising:

one or more processors;

a memory; and a plurality of instructions stored in the memory and executable by the one or more processors to:

receive a plurality of signals from on-board inertial sensors of an aircraft, the plurality of signals corresponding to motions of one or more portions of the aircraft;

utilize the plurality of signals to generate a plurality of observers, each observer comprising one or more estimated states of the aircraft;

utilize the plurality of observers to determine control law commands for one or more control surfaces of the aircraft, wherein the control law commands are configured to reduce vibration of the aircraft that is induced by a combination of uniform or non-uniform lateral wind gusts and non-uniform vertical wind gusts; and control the one or more control surfaces of the aircraft in accordance with the control law commands.

B1. The data processing system of paragraph B0, wherein the plurality of signals includes:

a first lateral acceleration at a forward portion of a fuselage of the aircraft;

a second lateral acceleration at an aft portion of the fuselage of the aircraft;

a third lateral acceleration at a midportion of the fuselage of the aircraft;

a yaw rate at the midportion of the fuselage of the aircraft; and a roll rate at the midportion of the fuselage of the aircraft.

B2. The data processing system of B0 or B1, wherein each observer comprises one or more estimated states of a respective one of the control surfaces.

B3. The data processing system of paragraph B2, wherein the control surfaces include:

a rudder of the aircraft;

ailerons of the aircraft; and flaperons of the aircraft.

B4. The data processing system of paragraph B3, wherein the control law commands for the ailerons of the aircraft are antisymmetric.

B5. The data processing system of paragraph B3, wherein the control law commands for the flaperons of the aircraft are antisymmetric.

B6. The data processing system of any one of paragraphs B0 through B5, wherein the control law commands are configured to dampen lateral mode excitations.

B7. The data processing system of any one of paragraph B6, wherein the lateral mode excitations have frequencies less than 10 Hertz.

B8. The data processing system of any one of paragraphs B0 through B7, wherein generating the plurality of observers includes applying one or more operations to one or more of the plurality of signals, the operations including at least one of addition, subtraction, and filtering.

C0. A method of reducing aircraft vibrations induced by wind gusts, comprising:

measuring motions of the aircraft including at least one lateral acceleration, a roll rate, and a yaw rate;

using the measured motions of the aircraft to estimate vibrations along the body of the aircraft induced by a combination of uniform or non-uniform lateral wind gusts and non-uniform vertical wind gusts; and compensating for the estimated vibrations by moving at least one of the aircraft ailerons and the aircraft flaperons.

C1. The method of paragraph C0, further comprising:

measuring the motions of the aircraft includes measuring lateral accelerations of a nose portion, a tail portion and a center of gravity portion of the aircraft, and measuring a roll rate and a yaw rate of the center of gravity portion of the aircraft; and compensating for the estimated vibrations includes compensating for estimated lateral mode excitations having elastic mode frequencies less than 10 Hertz.

Advantages, Features, and Benefits

The different embodiments and examples of aircraft modal suppression described herein provide several advantages over known solutions for reducing lateral mode excitations. For example, illustrative embodiments and examples described herein allow a novel control law design method for reducing structural vibration, thereby improving ride quality and decreasing wear on the aircraft.

Additionally, and among other benefits, the use of a non-uniform model in determining a control law for aircraft control surfaces provides better all-around modal suppression performance across a variety of flight conditions and turbulence scenarios, in comparison to using uniform wind gust models.

Additionally, and among other benefits, by using an observer to measure and estimate the structural response due to gusts, the disclosed method and system is a cost effective solution compared to alternatives which use co-located sensors or sensors dedicated to gust measurement.

Additionally, and among other benefits, illustrative embodiments and examples described herein allow preliminary control law designs to be accomplished before the airplane is flown in a flight test program.

Additionally, and among other benefits, illustrative embodiments and examples described herein allow an improvement to the performance, ride quality, and safety of the aircraft.

Additionally, and among other benefits, illustrative embodiments and examples described herein allow the airplane to be lighter and thus more fuel efficient.

Additionally, and among other benefits, illustrative embodiments and examples described herein take advantage of sensors and control surfaces that are already available on the airplane.

Additionally, and among other benefits, illustrative embodiments and examples described herein allow correctly capture the structural modes of the airframe, provide control effector inputs, provide sensor outputs, and provide gust inputs that capture non-uniform effects.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

The invention claimed is:

1. A method of aircraft modal suppression, the method comprising:

receiving a plurality of signals from on-board inertial sensors disposed at respective inertial-sensor positions of an aircraft, the plurality of signals corresponding to motions of the aircraft at the respective inertial-sensor positions, wherein the aircraft comprises one or more control surfaces spaced apart from the respective inertial-sensor positions;

utilizing the plurality of signals to generate a plurality of observers, each observer comprising one or more estimated states of a respective one of the one or more control surfaces of the aircraft;

utilizing the observers to determine control law commands for controlling the one or more control surfaces of the aircraft, wherein the control law commands are configured to reduce vibration of the aircraft that is induced by a combination of lateral wind gusts and non-uniform vertical wind gusts; and reducing the vibration of the aircraft that is induced by the combination of lateral wind gusts and non-uniform vertical wind gusts by moving the one or more control surfaces of the aircraft in accordance with the control law commands.

2. The method of claim 1, wherein the plurality of signals includes:

a first lateral acceleration at a forward portion of a fuselage of the aircraft;

a second lateral acceleration at an aft portion of the fuselage of the aircraft;

a third lateral acceleration at a midportion of the fuselage of the aircraft;

a yaw rate at the midportion of the fuselage of the aircraft; and a roll rate at the midportion of the fuselage of the aircraft.

3. The method of claim 1, wherein the one or more estimated states of the respective one of the one or more control surfaces include an estimated acceleration of the respective one of the one or more control surfaces.

4. The method of claim 3, wherein the one or more control surfaces include:

a rudder of the aircraft;

ailerons of the aircraft; and flaperons of the aircraft.

5. The method of claim 4, wherein the control law commands for the ailerons of the aircraft are antisymmetric.

6. The method of claim 4, wherein the control law commands for the flaperons of the aircraft are antisymmetric.

7. The method of claim 1, wherein the control law commands are configured to dampen lateral mode excitations.

8. The method of claim 7, wherein elastic contributions to the lateral mode excitations contain frequency components below 10 Hertz.

9. The method of claim 1, wherein generating the plurality of observers includes applying one or more operations to one or more of the plurality of signals, the operations including at least one of addition, subtraction, and filtering.

10. A data processing system for aircraft modal suppression, the system comprising:

one or more processors;

a memory; and a plurality of instructions stored in the memory and executable by the one or more processors to:

receive a plurality of signals from on-board inertial sensors of an aircraft, the plurality of signals corresponding to motions of one or more portions of the aircraft;

utilize the plurality of signals to generate a plurality of observers, each observer comprising one or more estimated states of a respective one of one or more control surfaces of the aircraft;

utilize the observers to determine control law commands for the one or more control surfaces of the aircraft, wherein the control law commands are configured to reduce vibration of the aircraft that is induced by a combination of lateral wind gusts and non-uniform vertical wind gusts; and control the one or more control surfaces of the aircraft in accordance with the control law commands.

11. The data processing system of claim 10, wherein the plurality of signals includes:

a first lateral acceleration at a forward portion of a fuselage of the aircraft;

a second lateral acceleration at an aft portion of the fuselage of the aircraft;

a third lateral acceleration at a midportion of the fuselage of the aircraft;

a yaw rate at the midportion of the fuselage of the aircraft; and a roll rate at the midportion of the fuselage of the aircraft.

12. The data processing system of claim 10, wherein the one or more estimated states of the respective one of the one or more control surfaces include an estimated vibration of the respective one of the one or more control surfaces.

13. The data processing system of claim 12, wherein the one or more control surfaces include:

a rudder of the aircraft;

ailerons of the aircraft; and flaperons of the aircraft.

14. The data processing system of claim 13, wherein the control law commands for the ailerons of the aircraft are antisymmetric.

15. The data processing system of claim 13, wherein the control law commands for the flaperons of the aircraft are antisymmetric.

16. The data processing system of claim 10, wherein the control law commands are configured to dampen lateral mode excitations.

17. The data processing system of claim 16, wherein the lateral mode excitations have frequencies less than 10 Hertz.

18. The data processing system of claim 10, wherein generating the plurality of observers includes applying one or more operations to one or more of the plurality of signals, the operations including at least one of addition, subtraction, and filtering.

19. A method of reducing aircraft vibrations induced by wind gusts, comprising:

measuring motions of an aircraft including at least one lateral acceleration, a roll rate, and a yaw rate, wherein the aircraft includes ailerons and flaperons;

using the measured motions of the aircraft to estimate vibrations along a body of the aircraft induced by a combination of lateral wind gusts and non-uniform vertical wind gusts; and compensating for the estimated vibrations by moving at least one of the ailerons and the flaperons.

20. The method of claim 19, wherein measuring the motions of the aircraft includes measuring lateral accelerations of a nose portion, a tail portion and a center of gravity portion of the aircraft, and measuring a roll rate and a yaw rate of the center of gravity portion of the aircraft; and wherein compensating for the estimated vibrations includes compensating for estimated lateral mode excitations having elastic mode frequencies less than 10 Hertz.

* * * * *